United States Patent
Zhu

(10) Patent No.: US 10,740,872 B2
(45) Date of Patent: Aug. 11, 2020

(54) IMAGE PROCESSING METHOD FOR DISPLAY DEVICE

(71) Applicant: SHENZHEN CHINA STAR OPTOELECTRONICS TECHNOLOGY CO., LTD., Shenzhen, Guangdong (CN)

(72) Inventor: Jiang Zhu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 111 days.

(21) Appl. No.: 16/090,178

(22) PCT Filed: Aug. 30, 2018

(86) PCT No.: PCT/CN2018/103225
§ 371 (c)(1),
(2) Date: Sep. 28, 2018

(87) PCT Pub. No.: WO2019/192139
PCT Pub. Date: Oct. 10, 2019

(65) Prior Publication Data
US 2020/0167894 A1  May 28, 2020

(30) Foreign Application Priority Data
Apr. 2, 2018 (CN) .......................... 2018 1 0284935

(51) Int. Cl.
*G06T 3/40* (2006.01)
(52) U.S. Cl.
CPC .......... *G06T 3/4007* (2013.01); *G06T 3/4053* (2013.01)

(58) Field of Classification Search
CPC .......................... G06T 3/4007; G06T 3/4053
See application file for complete search history.

(56) References Cited

U.S. PATENT DOCUMENTS

| 6,489,938 | B1 * | 12/2002 | Ito | G09G 3/3662 345/58 |
| 2007/0269137 | A1 * | 11/2007 | Ida | G06T 3/4053 382/299 |

(Continued)

FOREIGN PATENT DOCUMENTS

| CN | 101197911 A | * | 6/2008 |
| CN | 101197911 A | | 6/2008 |

(Continued)

*Primary Examiner* — Sarah Lhymn
(74) *Attorney, Agent, or Firm* — Leong C. Lei

(57) ABSTRACT

An image processing method for a display device is provided. The method includes steps of: setting one of the multiple pixels arranged as a matrix of the image to be processed as a pixel to be processed, and using the pixel to be processed as a center and setting remaining pixels as reference pixels; obtaining a maximum brightness value and a minimum brightness value of the brightness of the pixel to be processed and the brightness of each reference pixel; determining a relationship of the brightness relation value between the pixel to be processed and the reference pixels and a preset reference value; when the brightness relation value is greater than the preset reference value, setting the brightness of the pixel to be processed as the maximum brightness value, otherwise setting the brightness of the pixel to be processed as the minimum brightness value.

14 Claims, 3 Drawing Sheets

(56) References Cited

U.S. PATENT DOCUMENTS

| | | | |
|---|---|---|---|
| 2011/0280454 A1* | 11/2011 | Su .................... | G06K 9/0061 |
| | | | 382/117 |
| 2013/0127923 A1* | 5/2013 | An ..................... | G09G 5/10 |
| | | | 345/690 |
| 2013/0177242 A1* | 7/2013 | Adams, Jr. ......... | G06T 3/403 |
| | | | 382/167 |
| 2014/0320518 A1 | 10/2014 | Morishita et al. | |
| 2016/0055780 A1* | 2/2016 | Guo ................... | G09G 3/2003 |
| | | | 345/55 |
| 2019/0005676 A1* | 1/2019 | Yoshida .............. | G06T 7/33 |

FOREIGN PATENT DOCUMENTS

| | | |
|---|---|---|
| CN | 101661721 A | 3/2010 |
| CN | 101102515 B | 6/2010 |
| CN | 107680056 A | 2/2018 |

\* cited by examiner

| Y1 | Y2 | Y3 |
|----|----|----|
| Y4 | Y5 | Y6 |
| Y7 | Y8 | Y9 |

Fig. 2

IMAGE PROCESSING METHOD FOR DISPLAY DEVICE

RELATED APPLICATIONS

The present application is a National Phase of International Application Number PCT/CN2018/103225, filed Aug. 30, 2018, and claims the priority of China Application No. 201810284935.5, filed Apr. 2, 2018.

FIELD OF THE INVENTION

The present invention relates to a display technology field, and more particularly to an image processing method for display device.

BACKGROUND OF THE INVENTION

In the display technology field, flat panel display devices such as liquid crystal display (LCD) and organic light emitting diode (OLED) display devices have gradually replaced cathode ray tube (CRT) display devices.

The liquid crystal display device has many advantages such as a thin body, power saving, and no radiation, and has been widely applied. Most of the liquid crystal display devices in the current market are backlight type liquid crystal display devices, which include a liquid crystal display panel and a backlight module. Generally, the liquid crystal display panel is formed by a color filter (CF) substrate, a thin-film transistor (TFT) array substrate, a liquid crystal (LC) clamped between the color filter substrate and the thin-film transistor array substrate, and a sealant.

The operation principle of the liquid crystal display panel is to place liquid crystal molecules in two parallel glass substrates. There are many vertical and horizontal fine wires in the middle of the two glass substrates, and the liquid crystal molecules are controlled to change directions by applying a voltage or not, and refracting the light of the backlight module to generate an image.

With the continuous development of science and technology, people's living standards have been continuously improved, and consumers have become increasingly demanding for the quality of liquid crystal display devices, which has led to the development of resolution of liquid crystal display devices in an increasingly higher direction. However, since the collection of digital image signals lags behind the development of liquid crystal display devices, the problem of displaying low-resolution image signals on a high-resolution liquid crystal display device is often encountered. This requires processing the low-resolution images and converting the low-resolution images to high resolution image signals for normally displaying on a high-resolution liquid crystal display device.

However, a high-resolution image signal converted from a low-resolution image signal has a problem of blurring at the edges of the image. Because after the resolution is increased, the grayscale level is gradually changed at the edges for the pixel at the edge of the image, and the gradient value of the pixel at the transient region is decreased, which serious affect the display-quality of the image.

SUMMARY OF THE INVENTION

The purpose of the present invention is to provide an image processing method for a display device, which can enhance the contour of the image, make the image to be clear, and increase the display quality of the image.

In order to achieve the above purpose, the present invention provides an image processing method for a display device, comprising steps of: step S1 providing an image to be processed, wherein the image to be processed includes multiple pixels arranged as a matrix; step S2: setting one of the multiple pixels arranged as a matrix of the image to be processed as a pixel to be processed, and in N rows and M columns of a pixel array, using the pixel to be processed as a center and setting pixels except the pixel to be processed as reference pixels, wherein each of N and NI is an odd number greater than 1; step S3: obtaining a brightness of the pixel to be processed and a brightness of each reference pixel; step S4: calculating a brightness relation value of the pixel to be processes and the reference pixels according to the brightness of the pixel to be processed, the brightness of each reference pixel and a preset brightness relation formula; obtaining a maximum brightness value and a minimum brightness value of the brightness of the pixel to be processed and the brightness of each reference pixel according to the brightness of the pixel to be processed and the brightness of each reference pixel; step S5: determining a relationship of the brightness relation value between the pixel to be processed and the reference pixels and a preset reference value. When the brightness relation value between the pixel to be processed and the reference pixels is greater than the preset reference value, entering to a step S6, otherwise, entering a step S7; step S6: setting the brightness of the pixel to be processed as the maximum brightness value; and step S7: setting the brightness of the pixel to be processed as the minimum brightness value.

Wherein the preset brightness relation formula is: $\Delta E = (N \times M - 1)Y - X$; wherein, $\Delta E$ is the brightness relation value between the pixel to be processed and the reference pixels, Y is the brightness of the pixel to be processed, and X is a sum of the brightness of all reference pixels.

Wherein the preset reference value is 0.

Wherein M and N are equal.

Wherein in the step S2, the pixel array has 3 rows and 3 columns, and using the pixel to be processed as the center, and except the pixel to be processed, the remaining eight pixels are all reference pixel.

Wherein the pixel to be processed is located at a second row and a second column of the pixel array.

Wherein the image to be processed provided in the step S1 is an image obtained from an original image by being reconstructed through a super-resolution method, and a resolution of the image to be processed is greater than the resolution of the original image.

Wherein the image to be processed provided in step S1 is an image obtained from the original image by being processed under a bilinear interpolation and amplification.

Wherein the display device is a liquid crystal display device.

Wherein the display device is an organic light-emitting display device.

The present invention also provides an image processing method for a display device, comprising steps of: step S1: providing an image to be processed, wherein the image to be processed includes multiple pixels arranged as a matrix; step S2: setting one of the multiple pixels arranged as a matrix of the image to be processed as a pixel to be processed, and in N rows and M columns of a pixel array, using the pixel to be processed as a center and setting pixels except the pixel to be processed as reference pixels, wherein each of N and M is an odd number greater than 1; step S3: obtaining a brightness of the pixel to be processed and a brightness of each reference pixel; step S4: calculating a brightness relation value of the pixel to be processes and the reference pixels according to the brightness of the pixel to be processed, the brightness of each reference pixel and a preset brightness relation formula; obtaining a maximum brightness value and a minimum brightness value of the brightness of the pixel to be processed and the brightness of each reference pixel according to the brightness of the pixel to be processed and the brightness of each reference pixel; step S5: determining a relationship of the brightness relation value between the pixel to be processed and the reference pixels and a preset reference value. When the brightness relation value between the pixel to be processed and the reference pixels is greater than the preset reference value, entering to a step S6, otherwise, entering a step S7; step S6: setting the brightness of the pixel to be processed as the maximum brightness value; step S7: setting the brightness of the pixel to be processed as the minimum brightness value; Wherein the preset brightness relation formula is: $\Delta E=(N\times M-1)Y-X$; wherein, $\Delta E$ is the brightness relation value between the pixel to be processed and the reference pixels, Y is the brightness of the pixel to be processed, and X is a sum of the brightness of all reference pixels; wherein the preset reference value is 0; wherein M and N are equal; and wherein in the step S2, the pixel array has 3 rows and 3 columns, and using the pixel to be processed as the center, and except the pixel to be processed, the remaining eight pixels are all reference pixel.

The beneficial effects of the present invention: an image processing method for a display device of the present invention includes steps of: setting one of the multiple pixels arranged as a matrix of the image to be processed as a pixel to be processed, and using the pixel to be processed as a center and setting remaining pixels as reference pixels; obtaining a maximum brightness value and a minimum brightness value of the brightness of the pixel to be processed and the brightness of each reference pixel; determining a relationship of the brightness relation value between the pixel to be processed and the reference pixels and a preset reference value; when the brightness relation value is greater than the preset reference value, setting the brightness of the pixel to be processed as the maximum brightness value, otherwise setting the brightness of the pixel to be processed as the minimum brightness value. Through the above way, the present invention can enhance the contour of the image, make the image to be clear, and increase the display quality of the image.

BRIEF DESCRIPTION OF THE DRAWINGS

For a further understanding of the features and technical content of the present invention, please refer to the following detailed description of the invention and the accompanying drawings. However, the drawings are provided for reference and description only, and are not intended to limit the present invention.

FIG. 2 is a schematic diagram of the step S2 in the image processing method for a display device according to a preferred embodiment of the present invention.

DETAILED DESCRIPTION OF THE PREFERRED EMBODIMENT

In order to further illustrate the technical measures taken by the present invention and their effects, the following detailed illustration is made in conjunction with the preferred embodiments of the present invention and the accompanying drawings.

Figure 1:
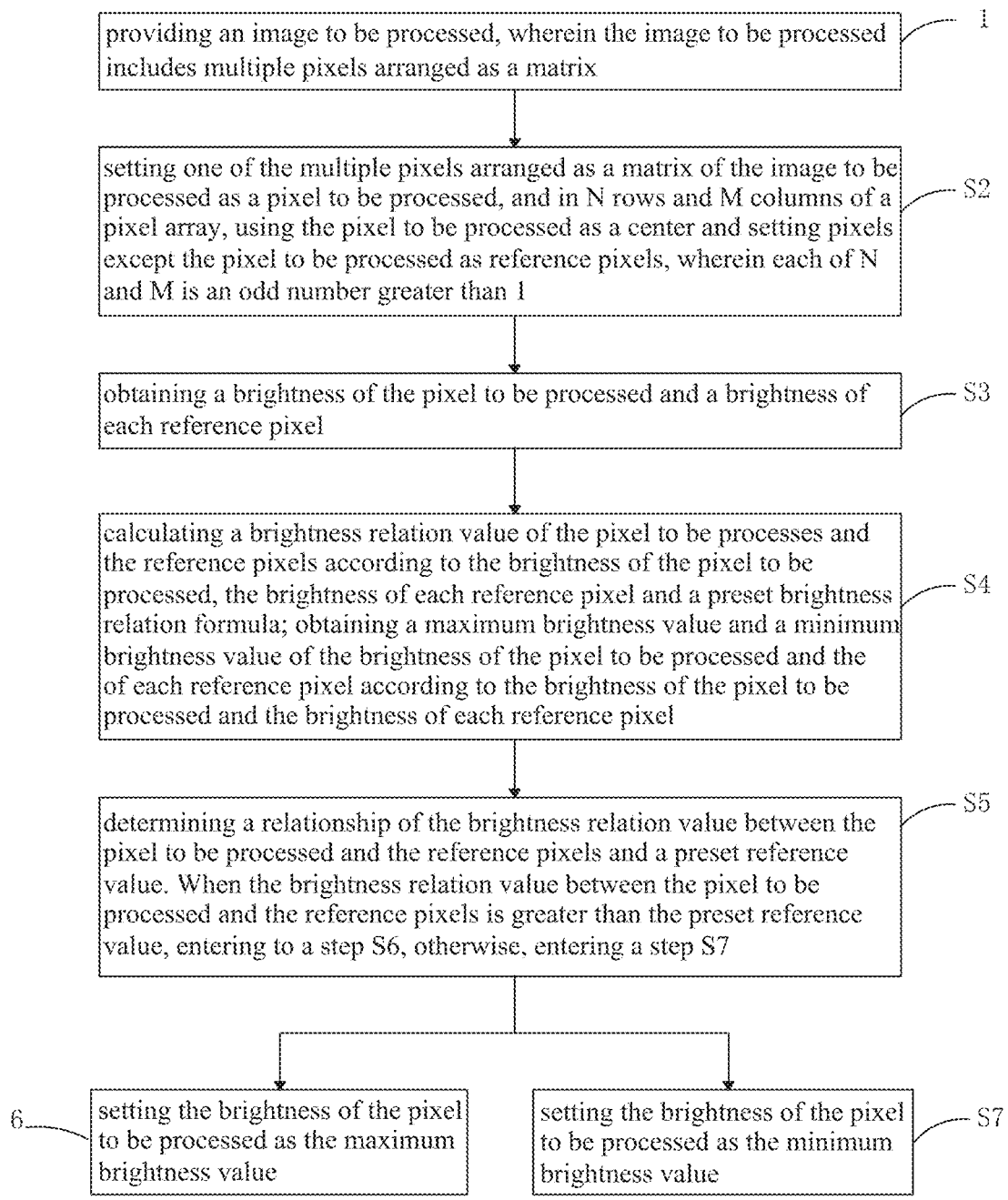
FIG. 1 is a flow chart of the image processing method for a display device of the present invention.

With reverence to FIG. 1, the present invention provides an image processing method for display device, and including following steps:

Step S1: providing an image to be processed. The image to be processed includes multiple pixels arranged as a matrix.

Specifically, the image to be processed provided in step S1 is an image obtained from an original image by being reconstructed through a super-resolution method. The resolution of the image to be processed is greater than the resolution of the original image. The image to be processed can be displayed in a display device having a higher resolution. The super-resolution reconstruction process may be a technique that is commonly used in the art to process a low-resolution image into a high-resolution image.

Preferably, the image to be processed provided in step S1 is an image obtained from the original image by being processed under a bilinear interpolation and amplification.

Specifically, the display device may be any flat display device in the prior art, for example, the display device may be a liquid crystal display device or an organic light-emitting diode display device.

Step S2, setting one of the multiple pixels arranged as a matrix of the image to be processed as a pixel to be processed, and in N rows and M columns of a pixel array, using the pixel to be processed as a center and setting pixels except the pixel to be processed as reference pixels, wherein each of N and NI is an odd number greater than 1.

Preferably, M is equal to N, that is, in the step S2, the number of rows and the number of columns of the pixel array are the same, and using the pixel to be processed as the center and setting pixels except the pixel to be processed as reference pixels.

Figure 2:
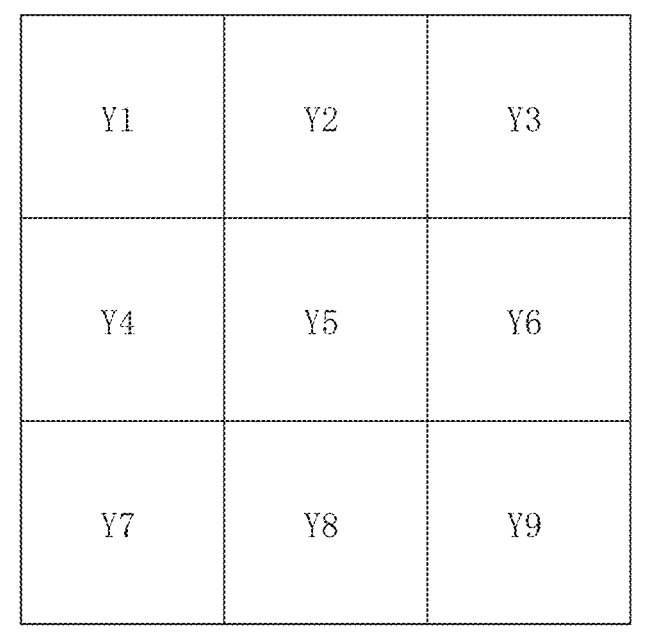

More preferably, with reference to FIG. 2, N and N in the step S2 all take 3, that is, in the step S2, the pixel array has 3 rows and 3 columns, and using the pixel to be processed as the center, and except the pixel to be processed, the remaining eight pixels are all reference pixel. The pixel to be processed Y5 is located at a second row and a second column of the pixel array. The eight reference pixels are respectively a reference pixel Y1 located at a first row and a first column, a reference pixel Y2 located at the first row and the second column, a reference pixel Y3 located at the first row and a third column, a reference pixel Y4 located at the second row and the first column, a reference pixel Y6 located at the second row and the third column, a reference pixel Y7 located at a third row and the first column, a reference pixel Y8 located at the third row and the second column and a reference pixel Y9 located at the third row and the third column.

Figure 3:
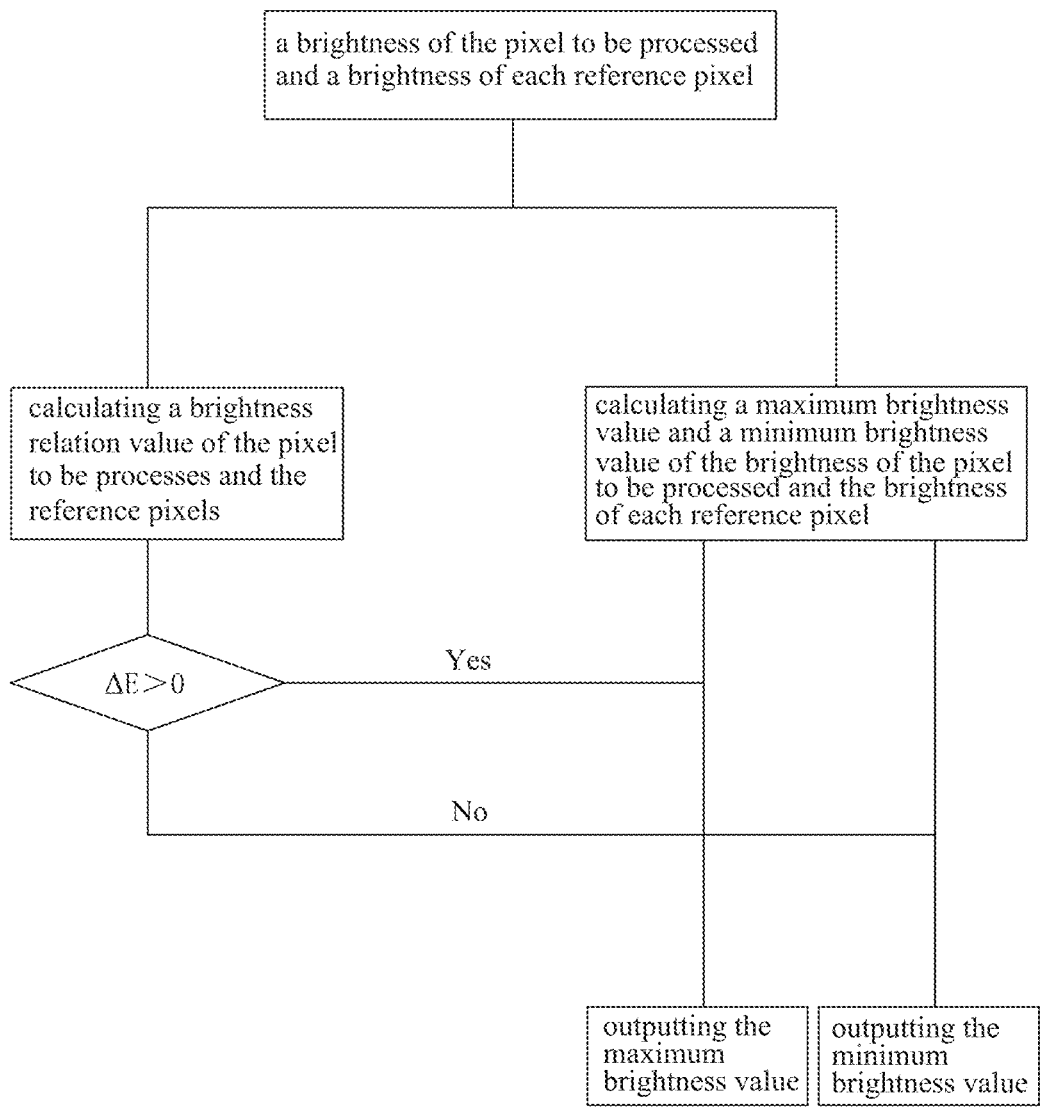
FIG. 3 is a logic block diagram of the steps S3 to S7 in the image processing method for a display device according to a preferred embodiment of the present invention.

Step S3: with reference to FIG. 3, obtaining a brightness of the pixel to be processed and a brightness of each reference pixel.

Step S4, with reference to FIG. 3, calculating a brightness relation value of the pixel to be processes and the reference pixels according to the brightness of the pixel to be processed, the brightness of each reference pixel and a preset brightness relation formula. Obtaining a maximum brightness value and a minimum brightness value of the brightness of the pixel to be processed and the brightness of each reference pixel according to the brightness of the pixel to be processed and the brightness of each reference pixel.

Specifically, the preset brightness relation formula is:

$$\Delta E=(N\times M-1)Y-X;$$

Wherein, ΔE is the brightness relation value between the pixel to be processed and the reference pixels, Y is the brightness of the pixel to be processed, and X is a sum of the brightness of all reference pixels, that is, the brightness relation value represents a sum of differences between the brightness of the pixel to be processed and the brightness of each reference pixel.

More preferably, when N and M in the step S2 all take 3, that is, in the step S2, the pixel array has 3 rows and 3 columns, and using the pixel to be processed as the center, and except the pixel to be processed, the remaining eight pixels are all reference pixel. The preset brightness relation formula is: ΔE=8×Y−(Y1+Y2+Y3+Y4+Y6+Y7+Y8+Y9). Wherein, Y1, Y2, Y3, Y4, Y6, Y7, Y8 and Y9 are respectively a brightness of the reference pixel Y1 located at a first row and a first column, a brightness of the reference pixel Y2 located at the first row and a second column, a brightness of the reference pixel Y3 located at the first row and a third column, a brightness of the reference pixel Y4 located at a second row and the first column, a brightness of the reference pixel Y6 located at the second row and the third column, a brightness of the reference pixel Y7 located at a third row and the first column, a brightness of the reference pixel Y8 located at the third row and the second column and a brightness of the reference pixel Y9 located at the third row and the third column using the pixel to be processed Y5 as a center in a 3 rows and 3 columns pixel array.

Step S5, with reference to FIG. 3, determining a relationship of the brightness relation value between the pixel to be processed and the reference pixels and a preset reference value. When the brightness relation value between the pixel to be processed and the reference pixels is greater than the preset reference value, entering to a step S6, otherwise, entering a step S7.

In the step S6, with reference to FIG. 3, setting the brightness of the pixel to be processed as the maximum brightness value.

In step S7, with reference to FIG. 3, setting the brightness of the pixel to be processed as the minimum brightness value.

Specifically, with reference to FIG. 3, in the step S5, the preset reference value is 0. When the brightness relation value between the pixel to be processed and the reference pixels is greater than 0, a sum of differences between the brightness of the pixel to be processed and the brightness of each reference pixel is greater than 0, that is, the brightness of the pixel to be processed is actually greater than an average value of the brightness of the reference pixels in the pixel array having 3 rows and 3 columns. In order to increase a sharpness of a contour of the image, setting the brightness of the pixel to be processed as the maximum brightness value in order to increase the brightness of the pixel to be processed.

When the brightness relation value between the pixel to be processed and the reference pixels is less than or equal to 0, the sum of differences between the brightness of the pixel to be processed and the brightness of each reference pixel is less than or equal to 0, that is, the brightness of the pixel to be processed is actually less than or equal to an average value of the brightness of the reference pixels in the pixel array having 3 rows and 3 columns. In order to increase a sharpness of a contour of the image, setting the brightness of the pixel to be processed as the minimum brightness value in order to decrease the brightness of the pixel to be processed.

Because a grayscale level (that is a brightness) at an edge of an image is generally in a gradually changing process, through the image processing method to adjust the brightness of the pixel, a grayscale gradation at the edge of the image, that is a brightness gradation is increased such that a contour of the image is strengthened, and the image is clearer to effectively increase the display quality of the image.

In summary, an image processing method for a display device of the present invention includes steps of: setting one of the multiple pixels arranged as a matrix of the image to be processed as a pixel to be processed, and using the pixel to be processed as a center and setting remaining pixels as reference pixels; obtaining a maximum brightness value and a minimum brightness value of the brightness of the pixel to be processed and the brightness of each reference pixel; determining a relationship of the brightness relation value between the pixel to be processed and the reference pixels and a preset reference value; when the brightness relation value is greater than the preset reference value, setting the brightness of the pixel to be processed as the maximum brightness value, otherwise setting the brightness of the pixel to be processed as the minimum brightness value. Through the above way, the present invention can enhance the contour of the image, make the image to be clear, and increase the display quality of the image.

The above embodiments of the present invention provide an illustration for a digital control driving method, a driving display device and a display device in detail. Specific examples are used herein to describe the principle and implementation manner of the present invention. The above embodiments are only used to help understanding the method and the core idea of the present invention; at the same time, for those skilled in the art, according to the present invention, the embodiments of the present invention will have changes in specific implementation manners and application ranges. In summary, the contents of this specification should not be construed as limiting the present invention.

What is claimed is:

1. An image processing method for a display device, comprising steps of:
    step S1: providing an image to be processed, wherein the image to be processed includes multiple pixels arranged as a matrix;
    step S2: setting one of the multiple pixels arranged as a matrix of the image to be processed as a pixel to be processed, and in N rows and M columns of a pixel array, using the pixel to be processed as a center and setting pixels except the pixel to be processed as reference pixels, wherein each of N and M is an odd number greater than 1;
    step S3: obtaining a brightness of the pixel to be processed and a brightness of each reference pixel;
    step S4: calculating a brightness relation value of the pixel to be processes and the reference pixels according to the brightness of the pixel to be processed, the brightness of each reference pixel and a preset brightness relation formula; obtaining a maximum brightness value and a minimum brightness value of the brightness of the pixel to be processed and the brightness of each reference pixel according to the brightness of the pixel to be processed and the brightness of each reference pixel;

step S5: determining a relationship of the brightness relation value between the pixel to be processed and the reference pixels and a preset reference value, when the brightness relation value between the pixel to be processed and the reference pixels is greater than the preset reference value, entering to a step S6, otherwise, entering a step S7;

step S6: setting the brightness of the pixel to be processed as the maximum brightness value; and step S7: setting the brightness of the pixel to be processed as the minimum brightness value;

wherein the preset brightness relation formula is:

$$\Delta E=(N\times M-1)Y-X;$$

wherein, $\Delta E$ is the brightness relation value between the pixel to be processed and the reference pixels, Y is the brightness of the pixel to be processed, and X is a sum of the brightness of all reference pixels;

wherein the preset reference value is 0.

2. The image processing method for the display device according to claim 1, wherein M and N are equal.

3. The image processing method for the display device according to claim 2, wherein in the step S2, the pixel array has 3 rows and 3 columns, and using the pixel to be processed as the center, and except the pixel to be processed, the remaining eight pixels are all reference pixel.

4. The image processing method for the display device according to claim 3, wherein the pixel to be processed is located at a second row and a second column of the pixel array.

5. The image processing method for the display device according to claim 1, wherein the image to be processed provided in the step S1 is an image obtained from an original image by being reconstructed through a super-resolution method, and a resolution of the image to be processed is greater than the resolution of the original image.

6. The image processing method for the display device according to claim 5, wherein the image to be processed provided in step S1 is an image obtained from the original image by being processed under a bilinear interpolation and amplification.

7. The image processing method for the display device according to claim 1, wherein the display device is a liquid crystal display device.

8. The image processing method for the display device according to claim 1, wherein the display device is an organic light-emitting display device.

9. An image processing method for a display device, comprising steps of:

step S1: providing an image to be processed, wherein the image to be processed includes multiple pixels arranged as a matrix;

step S2: setting one of the multiple pixels arranged as a matrix of the image to be processed as a pixel to be processed, and in N rows and M columns of a pixel array, using the pixel to be processed as a center and setting pixels except the pixel to be processed as reference pixels, wherein each of N and M is an odd number greater than 1;

step S3: obtaining a brightness of the pixel to be processed and a brightness of each reference pixel;

step S4: calculating a brightness relation value of the pixel to be processes and the reference pixels according to the brightness of the pixel to be processed, the brightness of each reference pixel and a preset brightness relation formula; obtaining a maximum brightness value and a minimum brightness value of the brightness of the pixel to be processed and the brightness of each reference pixel according to the brightness of the pixel to be processed and the brightness of each reference pixel;

step S5: determining a relationship of the brightness relation value between the pixel to be processed and the reference pixels and a preset reference value, when the brightness relation value between the pixel to be processed and the reference pixels is greater than the preset reference value, entering to a step S6, otherwise, entering a step S7;

step S6: setting the brightness of the pixel to be processed as the maximum brightness value;

step S7: setting the brightness of the pixel to be processed as the minimum brightness value;

wherein the preset brightness relation formula is:

$$\Delta E=(N\times M-1)Y-X;$$

wherein, $\Delta E$ is the brightness relation value between the pixel to be processed and the reference pixels, Y is the brightness of the pixel to be processed, and X is a sum of the brightness of all reference pixels;

wherein the preset reference value is 0;

wherein M and N are equal; and wherein in the step S2, the pixel array has 3 rows and 3 columns, and using the pixel to be processed as the center, and except the pixel to be processed, the remaining eight pixels are all reference pixel.

10. The image processing method for a display device according to claim 9, wherein the pixel to be processed is located at a second row and a second column of the pixel array.

11. The image processing method for a display device according to claim 9, wherein the image to be processed provided in the step S1 is an image obtained from an original image by being reconstructed through a super-resolution method, and a resolution of the image to be processed is greater than the resolution of the original image.

12. The image processing method for a display device according to claim 11, wherein the image to be processed provided in step S1 is an image obtained from the original image by being processed under a bilinear interpolation and amplification.

13. The image processing method for a display device according to claim 9, wherein the display device is a liquid crystal display device.

14. The image processing method for the display device according to claim 9, wherein the display device is an organic light-emitting display device.

* * * * *